United States Patent [19]

Rounds

[11] Patent Number: 5,461,753
[45] Date of Patent: Oct. 31, 1995

[54] SEAL FOR SWIVEL CASTER ASSEMBLY

[75] Inventor: Allan Rounds, North Adams, Mich.

[73] Assignee: Albion Industries, Inc., Albion, Mich.

[21] Appl. No.: 140,756

[22] Filed: Oct. 22, 1993

[51] Int. Cl.[6] .................................................. B60B 33/02
[52] U.S. Cl. ........................... 16/21; 16/35 R; 384/482
[58] Field of Search ................... 16/18 R, 18 CG, 16/20, 21, 35 R, 36; 384/482; 277/DIG. 4

[56] References Cited

U.S. PATENT DOCUMENTS

| | | | |
|---|---|---|---|
| 2,787,804 | 4/1957 | Noelting et al. | 16/21 |
| 2,891,827 | 6/1959 | Butkus | 277/DIG. 4 |
| 3,479,680 | 11/1969 | Clinton et al. | 16/21 |
| 3,892,448 | 7/1975 | Laing | 384/482 |
| 3,936,105 | 2/1976 | Asberg | 384/482 |
| 4,028,773 | 6/1977 | Morgan | 16/35 R |
| 4,097,954 | 7/1978 | Christensen | 16/21 |
| 4,118,080 | 10/1978 | Kregler et al. | 384/482 |
| 4,336,629 | 6/1982 | Jarvis, Jr. et al. | 16/35 R |
| 5,005,992 | 4/1991 | Dreschmann et al. | 384/482 |

FOREIGN PATENT DOCUMENTS 307641  1/1969  Sweden ..................... 16/21

*Primary Examiner*—Lowell A. Larson
*Assistant Examiner*—Donald M. Gurley

[57] ABSTRACT

A seal for a swivel caster assembly is disclosed. The seal protects the first ball bearing set of the assembly. The seal has a V-shaped cross section formed by seal legs that are joined at a bight and extend radially inward, and are in surface contact with the top plate and a notched swivel element of the assembly. The seal includes embossments that engage the notched swivel element and accept the pin of a swivel lock assembly.

2 Claims, 2 Drawing Sheets

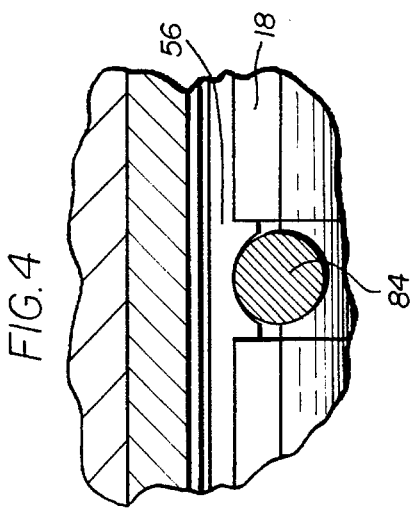
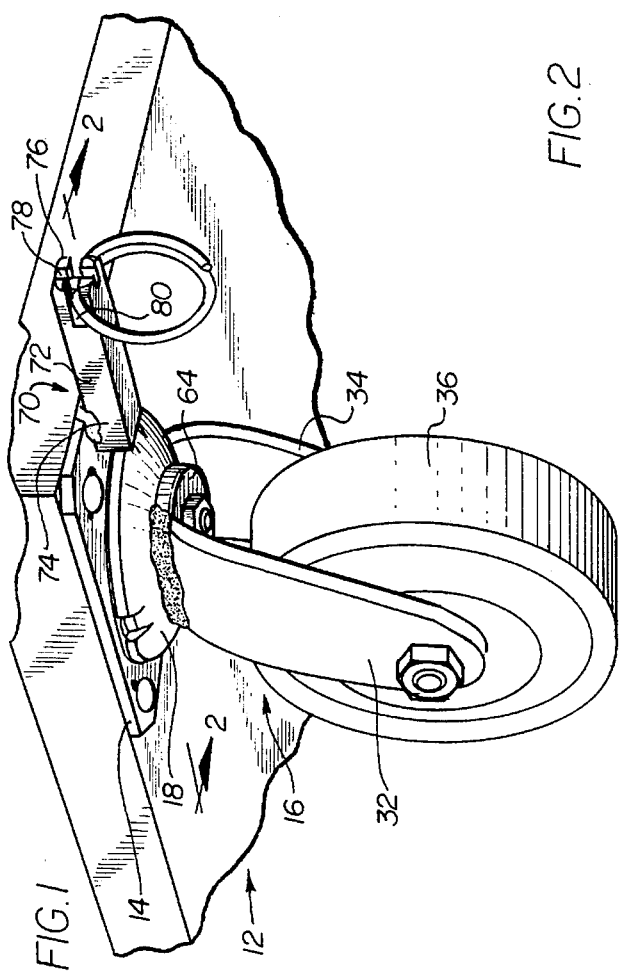
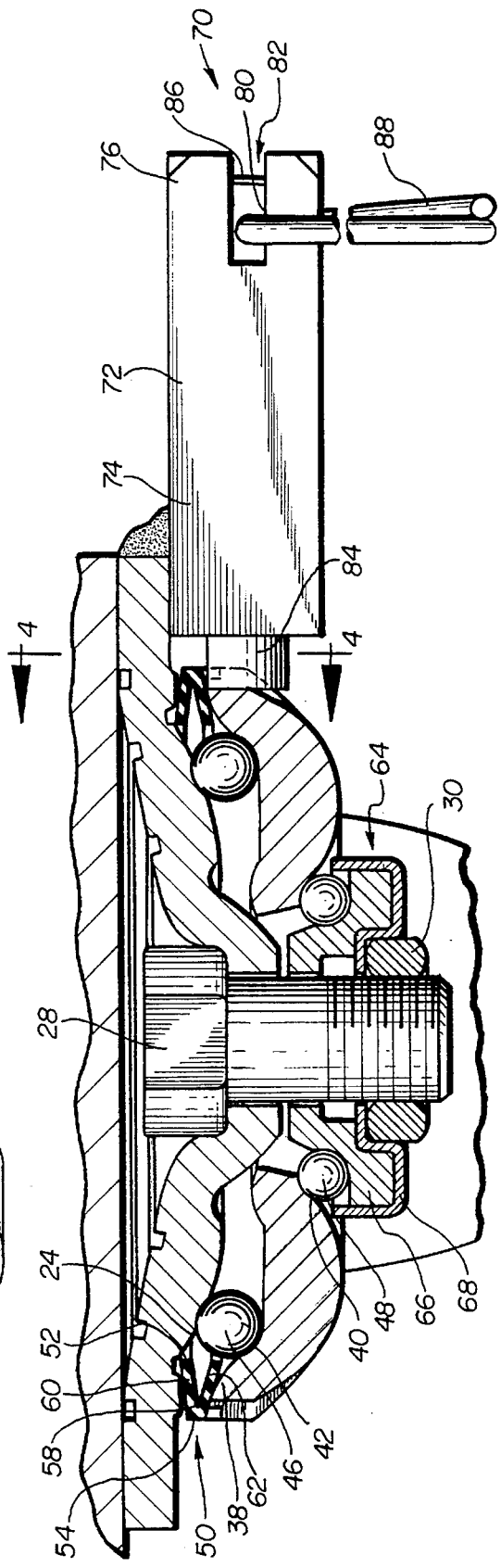

SEAL FOR SWIVEL CASTER ASSEMBLY

FIELD OF THE INVENTION

This invention relates generally to swivel caster assemblies, and more particularly, to a seal for the ball bearings of such caster assemblies.

BACKGROUND OF THE INVENTION

Caster assemblies are well-known and widely used in many industries. They are attached to carts, dollies, or other devices to provide easy movement of cumbersome or heavy objects. They may also be placed with other caster assemblies in an inverted orientation to form a rollerway facilitating the transport of heavy objects.

Caster assemblies may be characterized as rigid or swivel based on the type of movement they permit. Rigid caster assemblies permit only linear movement of the devices to which they are attached or the objects travelling over them. Swivel caster assemblies permit multi-directional movement of the devices to which they are attached or the objects travelling over them. Swivel caster assemblies may also be provided with a lock assembly which, when engaged, restricts the rotational movement of the assembly and thereby converts it to a rigid caster assembly.

To permit multi-directional movement, swivel caster assemblies typically include a wheel assembly attached to a top plate. The wheel assembly includes a swivel element attached to the lower face of the top plate, and legs projecting distally from the swivel element and attached by conventional means to a wheel. The swivel element enables the wheel to rotate about an axis perpendicular to the wheel's axis of rotation. In this way, the wheel can readily align itself in an appropriate direction under the influence of a load.

Conventional swivel caster assemblies typically utilize two sets of ball bearings to facilitate this swivel or rotational movement of the wheel assembly with respect to the top plate. A first ball bearing set is located between the swivel element and the top plate, and a second set ball bearing set is located between the swivel element and a cap which is rigidly attached to the top plate.

In conventional swivel caster assemblies, the first ball bearing set is uncovered and unprotected. The bearings of the first set are therefore exposed to dust, dirt, liquid, and other material found in industrial environments. As a result, the unprotected ball bearings become corrupted, and suffer impeded rolling action due to the presence of dirt or other particles. Impeded rolling action of the ball bearings results in impeded movement of the swivel element, which in turn results in impeded movement of the cart or device to which the caster assembly is attached. Indeed, ball bearing corruption in a swivel caster assembly may even cause the assembly to "freeze" or "lock up."

Further, because exposure to dust, dirt, and liquid corrupts the first ball bearing set of conventional swivel caster assemblies, the bearings require frequent lubrication-an inefficient and cumbersome process.

Finally, corruption of the first ball bearing set of conventional caster assemblies due to exposure to dust, dirt, and liquid decreases the service life of the entire swivel caster assembly. Once corrupted, the bearings themselves cannot efficiently be replaced. Instead, the entire swivel caster assembly must be replaced.

Accordingly, it is an object of the present invention to provide a seal for the first ball bearing set of a swivel caster assembly that increases the service life of the bearing set and the swivel caster assembly.

Another object of this invention is to provide a seal for the first ball bearing set of a swivel caster assembly that does not greatly increase the cost of the swivel caster assembly.

Yet another object of this invention is to provide a seal for the first ball bearing set of a swivel caster assembly that is secured to the swivel element of the assembly and accepts the pin of a swivel lock assembly, but does not wear rapidly from friction generated by rotation of the seal against the top plate.

A related object of this invention is to provide a swivel caster assembly in which the first ball bearing set is protected from exposure to and corruption by dust, dirt, and liquid, thereby increasing the service life of the both the ball bearing set and the entire swivel caster assembly.

Yet another related object of the invention is to provide a swivel caster assembly wherein the first ball bearing set is protected from corruption and therefore will not easily "lock up."

Other objects and advantages of the invention will become apparent to one skilled in the art upon reading the following detailed description and upon reference to the drawings. Throughout the drawings, like reference numerals refer to like parts.

SUMMARY OF THE INVENTION

The present invention relates to a seal for a swivel caster assembly. The seal protects the first ball bearing set of the swivel element of the assembly. The seal has a V-shaped cross section formed by seal legs joined at a bight and extending radially inwardly. The seal legs are in surface contact with both the top plate and swivel element of the assembly. The seal is secured to the swivel element by embossments that mate with notches in the swivel element, and accept the pin of a swivel lock assembly.

DESCRIPTION OF THE DRAWINGS

FIG. 1 is a perspective view of a swivel caster assembly incorporating the present invention.

FIG. 2 is a partial cross-sectional view of the swivel caster assembly of FIG. 1 taken substantially in the plane of line 2—2 in FIG. 1.

FIG. 4 is a fragmentary cross-sectional view of the swivel caster assembly of FIG. 2, taken substantially in the plane of line 4—4 in FIG. 2

DETAILED DESCRIPTION

Figure 3:
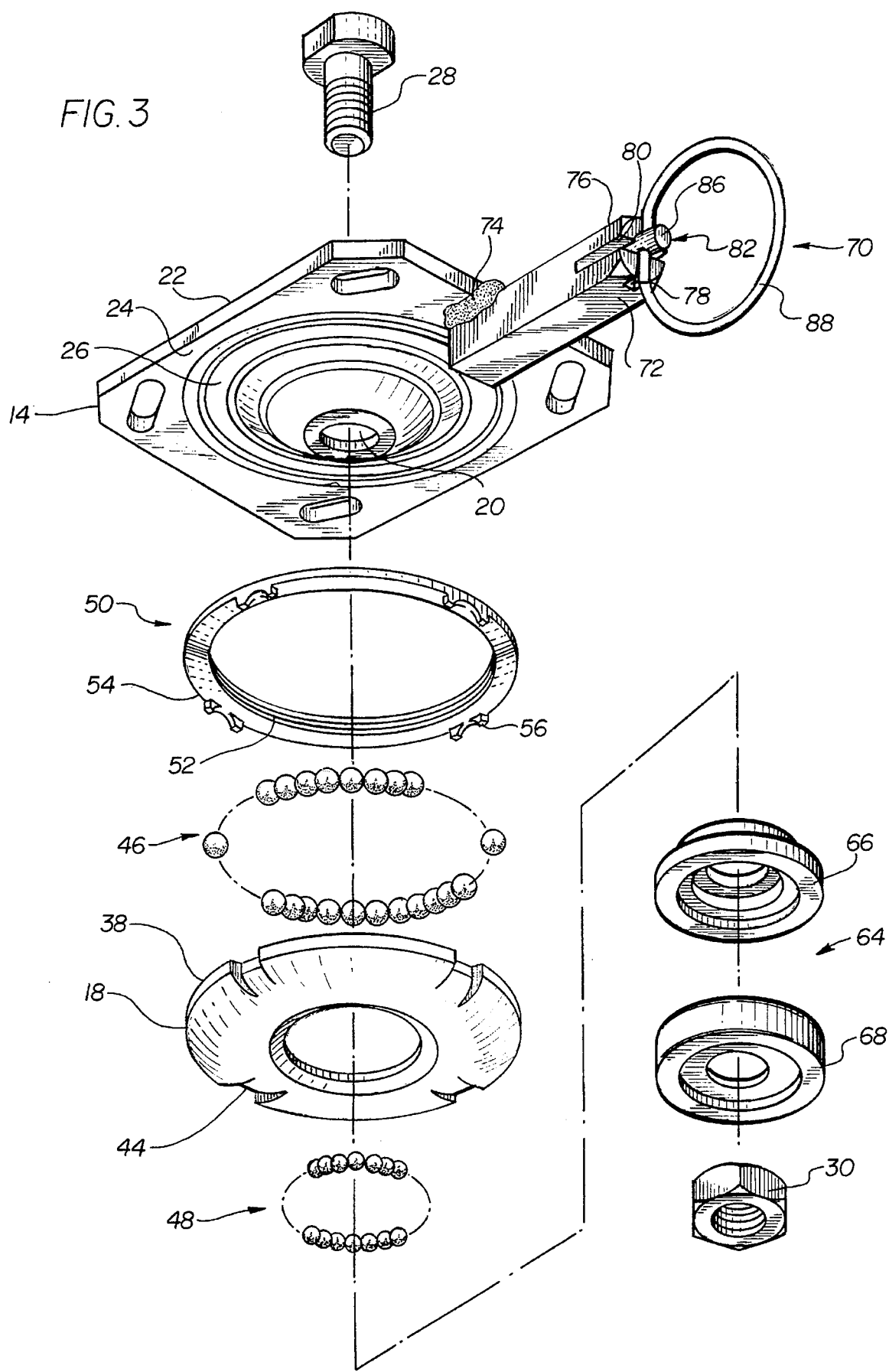
FIG. 3 is an exploded view of the swivel caster assembly of FIG. 1.

. While the invention will be described in connection with a preferred embodiment and procedure, it will be understood that it is not intended to limit the invention to this embodiment and procedure. On the contrary, it is intended to cover all alternatives, modifications, and equivalents as may be included within the spirit and scope of the invention.

Referring to FIG. 1, a swivel caster assembly incorporating the present invention is designated generally by the reference number 12. The swivel caster assembly 12 shown here includes a steel top plate 14 and a wheel assembly 16 with a swivel element 18.

To enable attachment of the top plate 14 to the wheel assembly 16, the top plate 14 is provided with a king pin hole 20, as shown in FIG. 3. To attach the top plate 14 to the wheel assembly 16, a king pin 28 is inserted through the king pin hole 20 and the wheel assembly 16, and a nut 30 is threaded onto the king pin 28 in a known arrangement. Although FIGS. 1, 2, and 3 show attachment of the top plate 14 to the wheel assembly 16 by the king pin 28 and the nut 30, other conventional attachment means, such as a rivet, may be utilized to achieve the attachment.

The top plate 14 is further provided with upper and lower faces 22 and 24, respectively. The top plate lower face 24 is machined or otherwise formed to provide a smooth, low-friction top plate bearing raceway 26 extending concentrically about the king pin hole 20 and the axis of rotation of the wheel assembly 16. The top plate bearing raceway 26 is of a known purpose and construction.

As shown in FIG. 1, the wheel assembly 16 includes the steel swivel element 18 and two steel wheel assembly legs 32 and 34. The wheel assembly legs 32 and 34 are welded to the swivel element 18, and extend distally to journal a wheel 36 for rotation in a known manner.

As shown in FIGS. 2 and 3, the swivel element 18 has an upper and lower face 38 and 40, respectively, and several notches 44. The swivel element upper face 38 includes a swivel bearing raceway 42. The swivel element 18 swivels smoothly around the king pin 28 by the actions of the first and second ball bearing sets 46 and 48, respectively, according to known principles of ball bearing operation. As further shown in FIG. 2, the first ball bearing set 46 is located between the top plate lower face 24 and the swivel element upper face 38, in the swivel bearing raceway 42.

In accordance with one aspect of the invention, the first ball bearing set 46 is protected from exposure to dust, dirt, and liquid by a seal 50 that engages the swivel element upper face 38 and the top plate lower face 24. The seal 50 is preferably made of rubber, specifically, thermosplastic rubber. One such suitable thermoplastic rubber is available from 21st Century Plastics Corp., Potterville, Mich.

To impart flexibility to the seal 50, and to allow the seal 50 to engage the top plate bearing raceway 26 and the swivel element upper face 38 in accordance with the invention, the seal 50 includes an interior perimeter 52 and an exterior perimeter 54, and has a V-shaped cross section, as shown in FIG. 2. The V-shaped cross section is formed by two seal legs 60 and 62. The seal legs 60 and 62 are joined at a bight 58 which is coextensive with the seal exterior perimeter 54. The interior perimeter 52 is positioned adjacent to the first ball bearing set 46. The seal legs 60 and 62 extend radially inward from the bight 58.

To secure the seal 50 to the swivel element 18 in accordance with the invention, the seal exterior perimeter 54 includes several embossments 56 to mate with the notches 44 of the swivel element 18. This arrangement results in conjoined movement of the swivel element 18 and the seal 50 in accordance with another aspect of this invention. When the swivel element 18 and the seal 50 rotate, the seal 50 slides over the smooth top plate lower face 24 in surface-to-surface contact. Therefore, the rotation of the swivel element 18 with the seal 50 against the top plate lower face 24 generates little friction. This arrangement results in smooth and efficient rotational movement of the swivel element 18 which does not decrease the useful life of the seal 50, in accordance with yet another aspect of the invention.

To enable the swivel element 18 to rotate smoothly around the king pin 28, the second ball bearing set 48 is located between the swivel element lower face 40 and within a cap assembly 64, as shown in FIG. 2. This second ball bearing set 48 further enables the swivel element 18 to rotate smoothly around the king pin 28. The cap assembly 64 includes a raceway element 66 and a cap 68. The raceway element 66 fits within the cap 68 and receives the second ball bearing set 48.

To enable conversion of the swivel caster assembly 12 into a rigid-type caster assembly, the swivel caster assembly 12 of the present invention can be provided with a swivel lock assembly 70, as shown in FIGS. 1, 2, and 3. To lock the wheel assembly 16 into any one of several pre-defined positions, the swivel lock assembly 70 includes a guide 72. The guide 72 has first and second guide ends 74 and 76, respectively. The first guide end 74 is attached to the top plate 14, preferably by welding. The second guide end 76 includes a shallow releasing slot 78 (FIGS. 1 and 2) and a deep locking slot 80.

A locking pin 82 with a first and second pin end 84 and 86, respectively, is releasably contained within the guide 72 by known methods of spring action. The second pin end 86 is attached to a pull ring 88. When the pull ring 88 is positioned in the shallow releasing slot 78, the swivel element 18 is free to rotate around the king pin 28. When the pull ring 88 is disengaged from the shallow releasing slot 78, rotated 90° and released, spring action forces the pull ring 88 into the deep locking slot 80. Concurrently, the locking pin first end 84 extends inwardly to engage a swivel element notch 44 and a seal embossment 56. When the locking pin first end 84 engages a swivel element notch 44 and a seal embossment 56, the swivel element 18 is prevented from rotating around the king pin 28. As a result, the wheel 36 can rotate in only one, predetermined plane, and the swivel caster assembly is thereby converted into a rigid caster assembly.

It can be appreciated from the foregoing description that the preferred embodiment of the present invention will protect the first ball bearing set of a swivel caster assembly from corruption due to exposure to dust, dirt, and liquid, thereby increasing the service life of both the ball bearing set and the swivel caster assembly.

What is claimed is:

1. A swivel caster assembly comprising:
 a top plate having upper and lower faces;
 a wheel assembly rotatably attached to the top plate, wherein the wheel assembly comprises a notched swivel element having upper and lower faces, a first ball bearing set between the lower face of the top plate and the upper face of the swivel element, an annular seal with interior and exterior perimeters with embossments on the exterior perimeter that engage the swivel element notches, the seal further including a V-shaped cross section defining two seal legs joined at a bight, the bight being located radially outward of the seal legs so that the seal opens radially inward toward the first ball bearing set, the seal being located between the lower face of the top plate and the upper face of the swivel element and adjacent to but radially outward of the first ball bearing set, the seal having embossments to mate with the swivel plate notches so that the seal will move conjointly with the swivel plate, a second ball bearing set below the lower face of the swivel element and within a cap assembly rigidly attached to the top plate, and wheel assembly legs extending distally from the lower face of the swivel element to engage a wheel mounted to an axle for rotation.

2. A swivel caster according to claim 1 including a locking pin assembly, wherein the locking pin assembly further comprises a guide attached to the top plate, a locking pin releasably contained in the guide and engageable with the swivel element notches and the seal embossments, and a pull ring attached to the locking pin.

* * * * *